(12) United States Patent
Oliver et al.

(10) Patent No.: US 11,620,900 B2
(45) Date of Patent: Apr. 4, 2023

(54) OBJECT TRACKING TECHNOLOGY BASED ON COGNITIVE REPRESENTATION OF A LOCATION IN SPACE

(71) Applicant: Intel Corporation, Santa Clara, CA (US)

(72) Inventors: Dario Oliver, Hillsboro, OR (US); Mateo Guzman, Beaverton, OR (US); Mariano Tepper, Portland, OR (US); Marcos Carranza, Portland, OR (US); Javier Turek, Beaverton, OR (US); Cesar Martinez-Spessot, Hillsboro, OR (US); Rita Wouhaybi, Portland, OR (US); Javier Felip Leon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 16/912,978

(22) Filed: Jun. 26, 2020

(65) Prior Publication Data

US 2020/0327802 A1    Oct. 15, 2020

(51) Int. Cl.
*G08G 1/01* (2006.01)
*G08G 1/04* (2006.01)
*H04N 7/18* (2006.01)

(52) U.S. Cl.
CPC ......... *G08G 1/0133* (2013.01); *G08G 1/0116* (2013.01); *G08G 1/04* (2013.01); *H04N 7/181* (2013.01)

(58) Field of Classification Search
CPC ...... G08G 1/04; G08G 1/0116; G08G 1/0133; G06T 7/277; G06T 7/292;
(Continued)

(56) References Cited

U.S. PATENT DOCUMENTS 9,846,810 B2* 12/2017 Partis ..................... G06V 20/53
2004/0080341 A1* 4/2004 Sasaki ..................... H01L 24/73
326/86

(Continued)

OTHER PUBLICATIONS

European Search Report for EPO Patent Application No. 20212723.9, dated Jun. 1, 2021, 9 pages.

(Continued)

*Primary Examiner* — Brenda C Bernardi
(74) *Attorney, Agent, or Firm* — Jordan IP Law, LLC

(57) ABSTRACT

Systems, apparatuses and methods may provide for origination camera technology that generates a cell representation of a local space associated with an origination camera in a multicast domain, predicts that an object in the local space will exit the local space and enter one or more adjacent spaces associated with additional cameras in the multicast domain, and sends the cell representation and a trajectory of the object to the additional cameras before the object exits the local space. Additionally, transition camera technology may generate a leader election message based on a multicasted trajectory of an object and a predicted trajectory of the object, send the leader election message from a transition camera to one or more additional cameras in a multicast domain, and track the object in the local space in response to a leader notification message.

11 Claims, 11 Drawing Sheets

(58) Field of Classification Search
CPC . G06T 2207/20084; G06T 2207/30232; G06T 2207/30196; G06T 2207/30241; G06T 2207/30236; H04N 7/181; H04W 4/029
See application file for complete search history.

(56) References Cited

U.S. PATENT DOCUMENTS

| | | | | |
|---|---|---|---|---|
| 2009/0304229 | A1* | 12/2009 | Hampapur | G06V 10/28 |
| | | | | 382/103 |
| 2012/0249802 | A1 | 10/2012 | Taylor | |
| 2012/0299098 | A1* | 11/2012 | Liu | H01L 29/66833 |
| | | | | 257/E21.409 |
| 2014/0072174 | A1* | 3/2014 | Wedge | G06T 7/292 |
| | | | | 382/103 |
| 2016/0171310 | A1* | 6/2016 | Kasahara | G06V 20/52 |
| | | | | 348/159 |
| 2020/0034983 | A1 | 1/2020 | Finkelstein et al. | |

OTHER PUBLICATIONS

S. Agarwal et al., "Building Rome in a Day," Communications of the ACM, vol. 54, Issue 10, Oct. 2011, 8 pages.

N. Cazin et al., "Reservoir computing model of prefrontal cortex creates novel combinations of previous navigation sequences from hippocampal place-cell replay with spatial reward propagation," PLoS Computational Biology, vol. 15, No. 7, Jul. 15, 2019, 32 pages.

T. Chen et al., "ABD-Net: Attentive but Diverse Person Re-Identification," Aug. 9, 2019, 11 pages, Texas A&M University, Texas, USA.

genetec.com, "Enhancing Physical Security through System Unification," <resources.genetec.com/en-whitepapers/enhancing-physical-security-through-system-unification>, 14 pages, retrieved Jun. 24, 2020.

Intellivision, "AI Video Analytics for Smart City Security and Surveillance Cameras," <intelli-vision.com/ai-video-analytics-smart-city-security/>, 6 pages, retrieved Jun. 24, 2020.

Intellivision, "Smart City/Security Solution," <intelli-vision.com/wp-content/uploads/2019/04/IntelliVision_SmartSecurity_solutionbrief0419.pdf>, 2 pages, retrieved Jun. 24, 2020.

A. Kermarrec et al., "Gossiping in Distributed Systems," ACM SIGOPS Operating Systems Review, vol. 41, No. 5, Oct. 2007, 6 pages.

P. Krzyzanowski et al., "Understanding Paxos: Asynchronous Fault-Tolerant Consensus", 10 pages, <cs.rutgers.edu/~pxk/417/notes/paxos.html> retrieved Nov. 1, 2018.

Milestone Systems, "Milestone Systems Video Management Software," <milestonesys.com/solution/platform/video-management-software/>, 11 pages, retrieved Jun. 24, 2020.

Milestone Systems, "Milestone XProtect Video Management Software," Brochure, <content.milestonesys.com/media/?mediaId=72421A2B-9E3E-4708-B2DFCD4D7A8126B4>, 12 pages, retrieved Jun. 24, 2020.

senstar.com, "Video Management Software, Security Management, Information Management," <senstar.com/products/video-managment/symphony/>, 5 pages, retrieved Jun. 24, 2020.

Senstar Symphony, "Architectural and Engineering Specification: Senstar Symphony Video Management Software," <senstar.com/wp-content/uploads/Symphony_AE_EN.pdf>, 25 pages, retrieved Oct. 22, 2019.

M. Tepper, Do place cells dream of conditional probabilities? Learning Neural Nystrom Representations, Jun. 5, 2019, 16 pages, Intel laboratory, Oregon, USA.

* cited by examiner

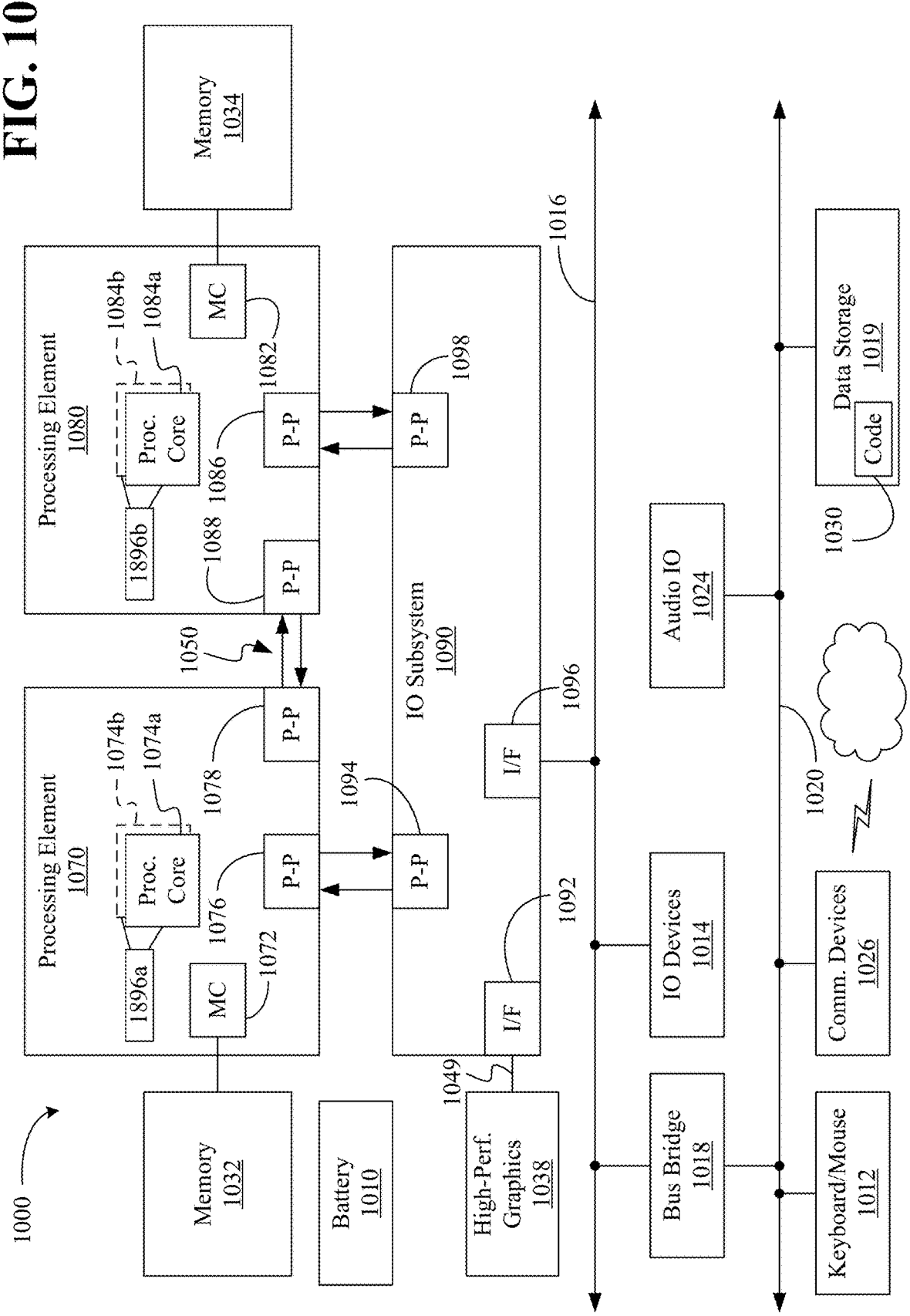

OBJECT TRACKING TECHNOLOGY BASED ON COGNITIVE REPRESENTATION OF A LOCATION IN SPACE

TECHNICAL FIELD

Embodiments generally relate to object tracking. More particularly, embodiments relate to object tracking technology based on cognitive representations of a location in space.

BACKGROUND

Tracking objects such as vehicles and individuals in large physical areas (e.g., cities) is often useful for public safety, law enforcement and/or security. Conventional approaches may involve the deployment of a distributed array of fixed cameras, which may be manually operated or equipped with object recognition software. Manually operated fixed camera solutions may suffer from human error and may be limited in the number of objects that can be tracked simultaneously. Fixed camera solutions containing object recognition software may involve a relatively high amount of computational overhead and/or power consumption and may be limited to still images. In either case, the large array of fixed cameras typically increases costs (e.g., equipment, deployment and/or maintenance). While pan, tilt, zoom (PTZ) cameras may address cost issues of fixed camera arrays, there remains considerable room for improvement. For example, manually operated PTZ camera solutions may still encounter human error and simultaneous tracking concerns, as well as blind spot challenges.

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a multi-processor based computing system according to an embodiment.

DESCRIPTION OF EMBODIMENTS

Figure 1:
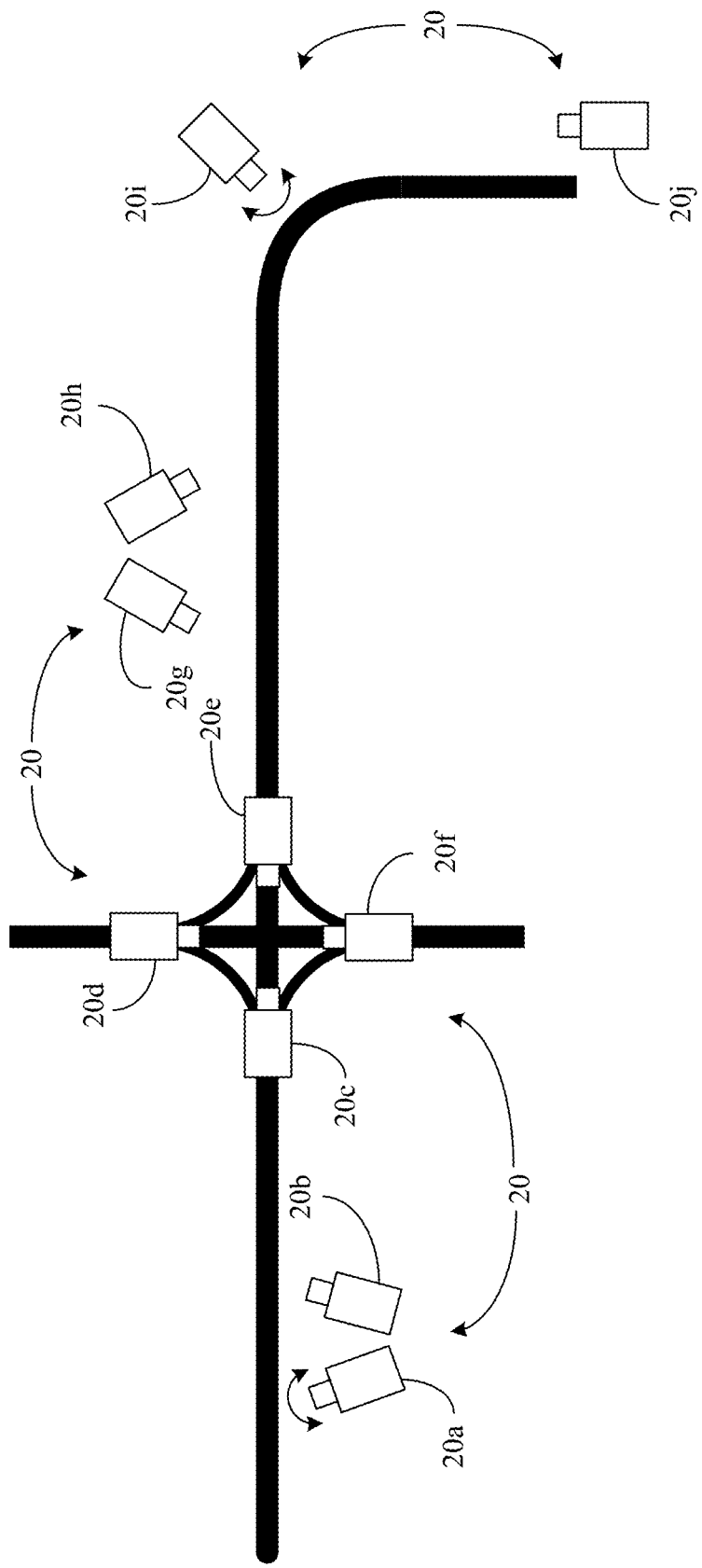
FIG. 1 is a plan view of an example of a camera deployment at an intersection according to an embodiment.

Turning now to FIG. 1, an object tracking solution is shown in which a plurality of cameras 20 (20a-20j, e.g., edge nodes) are deployed around a physical area (e.g., intersection). The cameras 20 may include a combination of stationary (e.g., fixed) cameras and non-stationary (e.g., pan, tilt, zoom/PTZ) cameras. For example, a first camera 20a and a ninth camera 20i may be non-stationary cameras, whereas a second camera 20b, a third camera 20c, a fourth camera 20d, a fifth camera 20e, a sixth camera 20f, a seventh camera 20g, an eighth camera 20h and a tenth camera 20j may be stationary cameras. Other arrangements, configurations and/or combinations of stationary and non-stationary cameras may be used, depending on the circumstances.

As will be discussed in greater detail, each camera 20 may have the compute capabilities to execute machine learning (ML) based workloads over a respective dataset (e.g., video feed), and networking capabilities to communicate the results of the execution with other cameras 20 participating in the object tracking. In an embodiment, distributing the cameras 20 over a large physical space maximizes the coverage of the visible space. Moreover, the cameras 20 may be strategically located to have overlapping fields of view so that a singular point in the visible space is observed by two or more cameras 20. For example, the visible space of the illustrated eighth, ninth and tenth cameras 20h-20i are redundant. From a network perspective, each healthy camera 20 can directly communicate with other healthy cameras 20 at any moment in time, and every camera 20 is aware of the adjacent healthy cameras 20 and their respective network addresses.

Figure 2A:
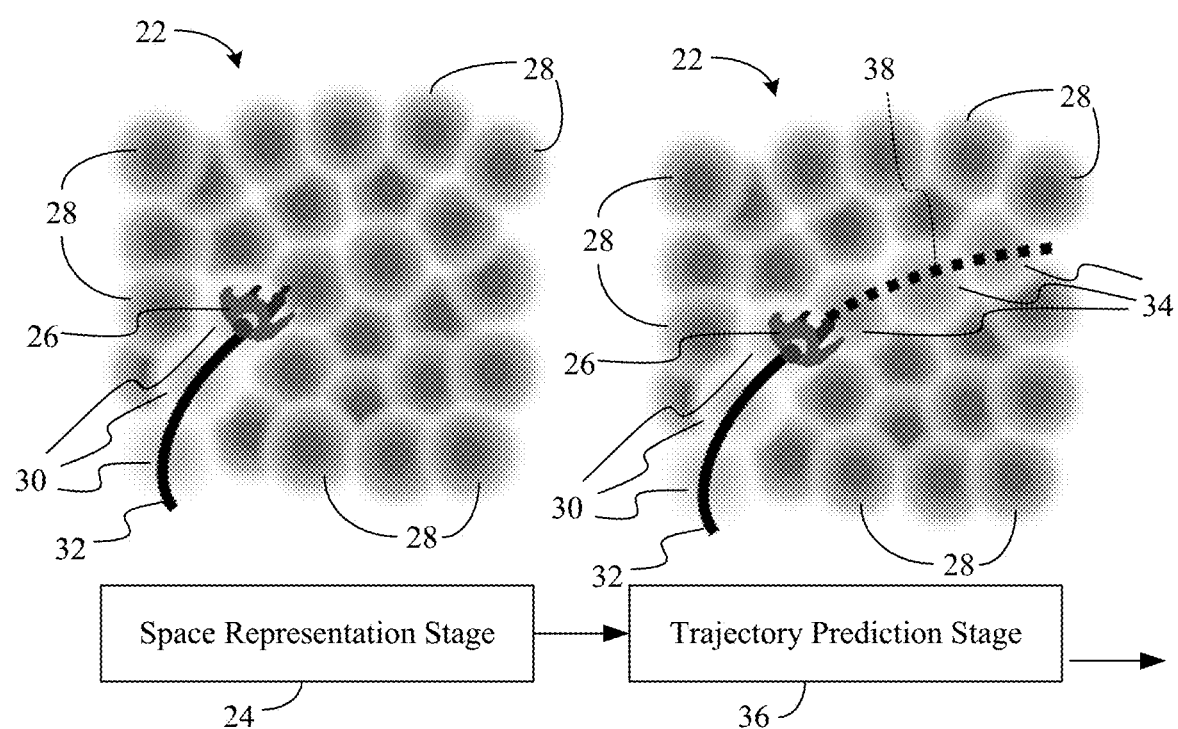
FIG. 2A is a plan view of an example of a cell representation of a local space and a trajectory of an object in the local space according to an embodiment.

FIG. 2A shows a cell representation 22 of a space during a space representation stage (e.g., subsystem) 24. In general, each edge node may include an object detection subsystem (not shown), which can be any automatic object detector. User input may be added to the object detection subsystem to focus the attention of the tracking system on particular objects (e.g., vehicles, individuals). For example, once an object 26 (e.g., traversing agent) is detected, projection mapping may be used to determine the center of mass of the object 26, with the center of mass being passed to the space representation stage 24.

In an embodiment, the space representation stage 24 produces the cell representation 22 to summarize the physical space. In one example, the cell representation 22 is more detailed around highly treaded areas and coarser in other areas. The space representation stage 24 may be modelled with a convolutional neural network (CNN). In the illustrated example, the cell representation 22 takes the form of a "soft tiling" of the physical space. In an embodiment, the soft tiling includes a set of units (e.g., cells) that tile the tracked space while partially and locally overlapping one another. For example, a one set of cells 28 in the representation 22 might correspond to observed inactivity (e.g., non-occupied "silent" tiles), whereas another set of cells 30 may correspond to observed activity. The set of cells 30 corresponding to observed activity may be used to automatically determine an observed (e.g., partial) trajectory 32 of the object 26. In one example, the number of cells in the representation 22 is a fixed hyperparameter of the tracking system. For example, the size of the cells may be automatically inferred to tile the space as well as possible, with the number of place cells being a user-tunable parameter that is globally chosen for all cameras.

Given the observed trajectory 32 through the physical area, a trajectory prediction stage 36 may use a recurrent neural network to predict a set of cells 34 corresponding to predicted activity. In one example, a predicted trajectory 38 is automatically determined based on the set of cells 34 corresponding to predicted activity. In an embodiment, the neural network in the trajectory prediction stage 36 learns to predict trajectories so that the object 26 can be successfully tracked and/or identified. For example, the neural network may be trained based on object trajectories so that the neural network learns to predict the trajectory 38 given the set of cells 30 corresponding to observed activity. As will be discussed in greater detail, the predicted trajectory 38 and the cell representation 22 may be multicasted to additional cameras monitoring spaces that are adjacent to the local space.

Additionally, a distributed transfer learning subsystem (not shown) may provide information about the object 26 being tracked and any appropriate data trail. For example, the first camera might have had a direct view of a vehicle license plate and transformed the license plate into metadata. Meanwhile, the third camera may have detected the face and potentially demographics of the driver. In such a case, the license plate, facial data and/or demographics may be features incorporated into the multicasted cell representation 22. Other features such as speed, angle, acceleration, etc., may also be included. As more cameras join the mission of predicting the direction of the object 26 and detecting features, more information may be collected and passed along to other cameras.

Similar to hippocampal place cells in the animal brain, the cell representation 22 therefore functions as a cognitive representation that enables a large number of devices to be incorporated together while maximizing efficiency, reliability and performance. In an embodiment, the edge nodes form communities that track specific (e.g., out of the norm) behavior, objects with specific characteristics, or specific manually selected objects. Accordingly, a subset of the cameras (e.g., edge nodes) may participate in a tracking exercise, which becomes more focused and efficient.

Figure 2B:
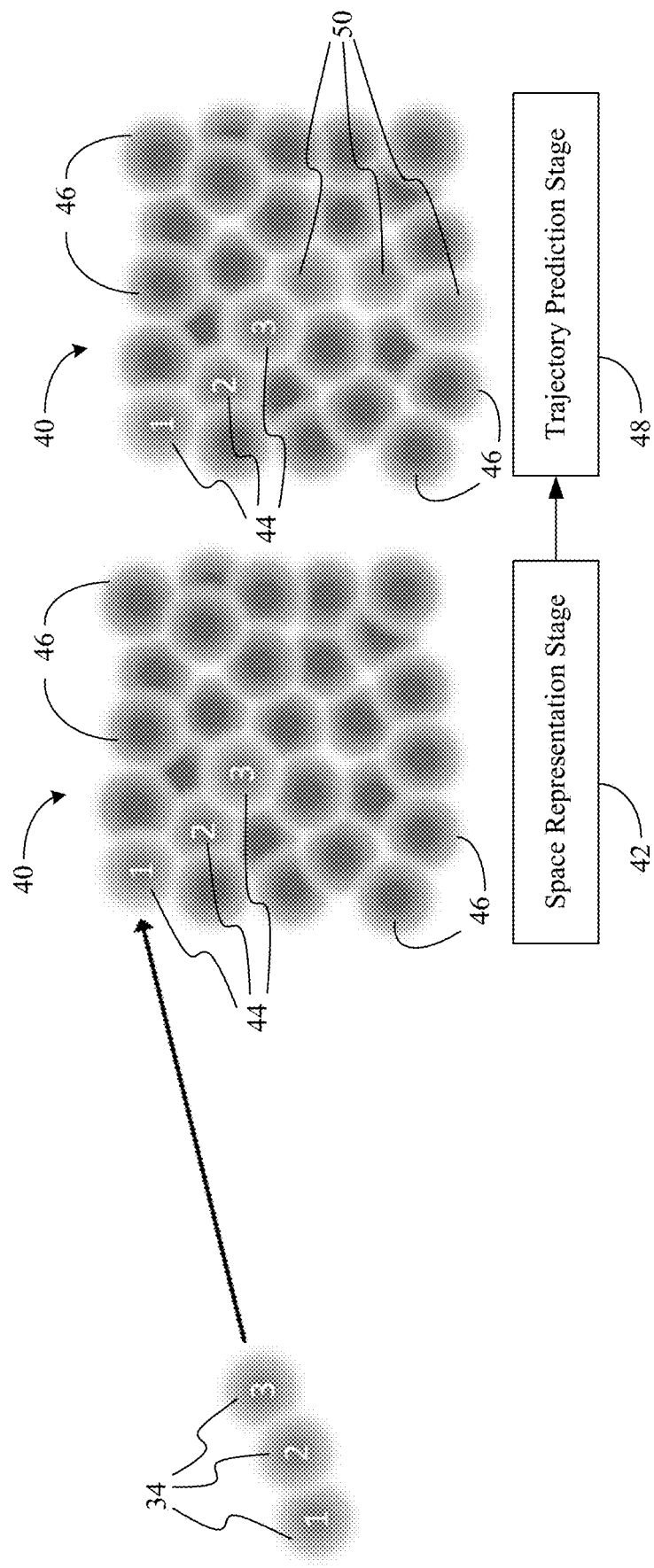
FIG. 2B is a plan view of an example of a cell representation of an adjacent space and a predicted trajectory of an object in the adjacent space according to an embodiment.

FIG. 2B shows a cell representation 40 of a space that is adjacent to the space modeled by the cell representation 22 (FIG. 2A). Thus, the adjacent space may be monitored by an additional camera in the distributed array of cameras. In the illustrated example, a space representation stage 42 of the additional camera maps a multicasted trajectory corresponding to the set of cells 34 (e.g., activity predicted by the origination camera) onto the cell representation 40 of the adjacent space. Thus, the cell representation 40 may include a set of cells 44 corresponding to the multicasted trajectory and a set of cells 46 corresponding to observed inactivity.

More particularly, a trajectory prediction stage 48 may calculate/determine whether the predicted path will be contained in the visible space of the additional camera. A conversion function using perspective transformation that transforms the matrix representation of place cells from the origination edge node to the adjacent edge node takes place. By employing the center of mass of the place cells in 3D (three-dimensional) physical space (e.g., which lie on the same two-dimensional/2D ground plane), a perspective transform of the place cells and their respective activations may be performed from one camera to the other (e.g., using camera intrinsic and extrinsic parameters). In one example, the output of this function is:

1. No value, if the predicted path will not be contained in the visible space of the additional (e.g., receiving) camera.
2. The set of cells that are activated by the predicted path. As will be discussed in greater detail, the number of cells predicted to be activated may represent a metric (e.g., NPlaceCells) reported by the additional camera in a leader election message. In the illustrated example, the cell representation 40 also includes a set of cells 50 corresponding to a predicted trajectory. Thus, the number of cells predicted to be activated is six (i.e., the sum of the mapped trajectory—three—and the predicted trajectory—three). That sum may be used by other edge nodes to make a decision about which edge node will assume the leader role and continue the tracking and identification process.

Figure 3:
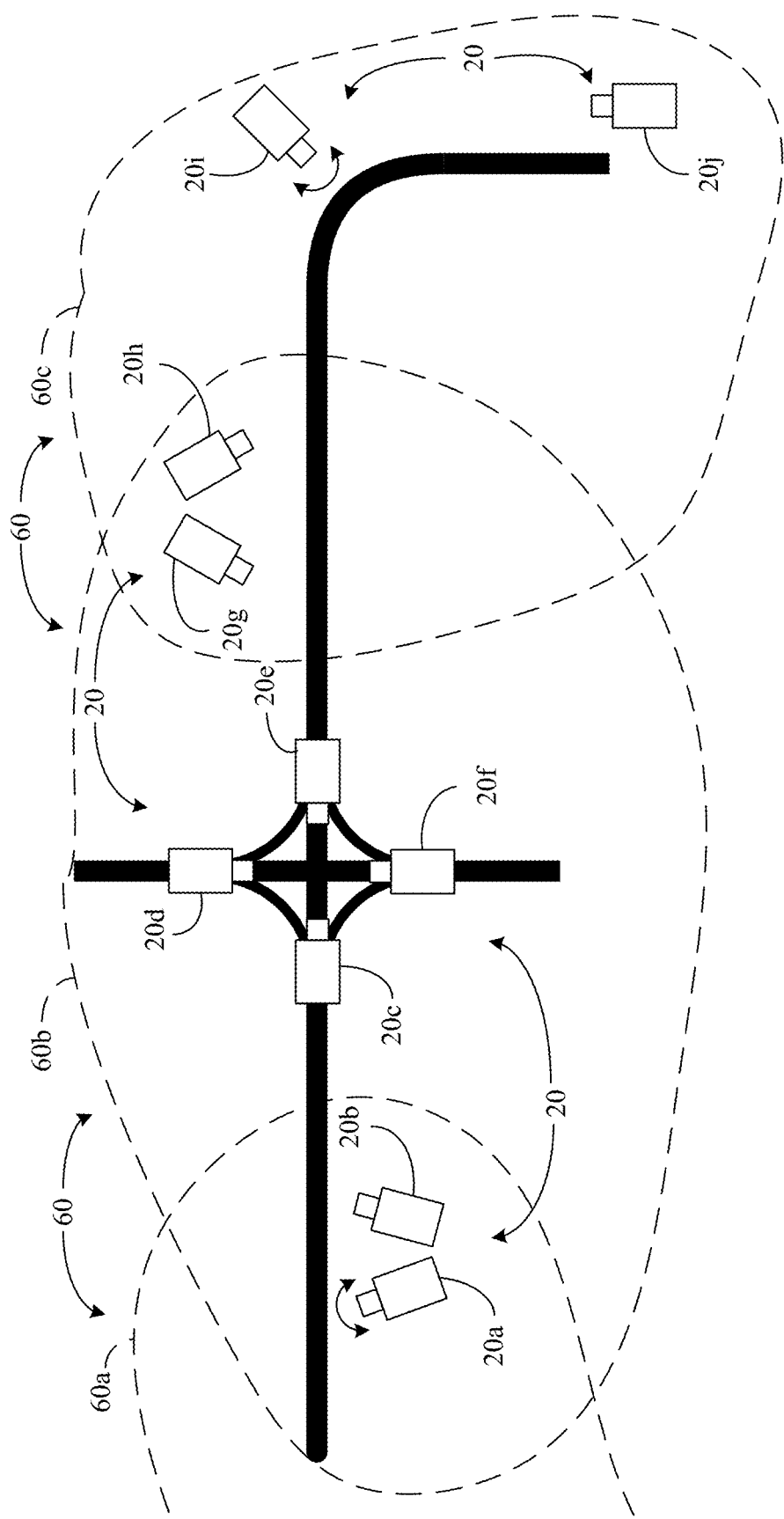
FIG. 3 is a plan view of an example of a plurality of multicast domains according to an embodiment.

FIG. 3 shows a plurality of multicast domains 60 (60a-60c). In general, the cognitive representation of the predicted path of the tracked object is communicated to adjacent edge nodes using an efficient distributed procedure such as, for example, a Gossip-style procedure, which guarantees that the information will spread in O (Log N) time and guarantees eventual consistency (e.g., all of the healthy cameras in the network will receive the message). To optimize the information sharing protocol, the cameras 20 are organized into the multicast domains 60. The content of the messages includes the appropriate information so that the receiving camera 20 can calculate whether the predicted path will be contained in the cognitive representation of the visible space monitored by the camera 20 in question.

In certain cases, there might be multiple possible paths, such as an intersection or a roundabout. In such a case, the camera 20 may send the information to multiple potential recipients to guarantee coverage, with a request for the receiving cameras 20 to communicate back the outcome of the trajectory prediction. This communication enables the sending camera 20 to score the different paths as a success/failure metric. Features of the object (e.g., speed, angle, acceleration, etc.) may also be used in generating the predictions.

To effectively share the cognitive representation of locations in space, a calibration may be conducted between the different cameras 20. For example, calibration techniques might involve reconstructing the relative position of adjacent cameras 20 and identifying potential areas that translate into an intersection of the place cells between the different cameras 20. Although the details of the calibration techniques are not described herein, the calibration may also help in the division of the cameras 20 into the multicast domains 60, combined with the network topology awareness of the cameras 20. Additionally, a TTL (time to live) like property may be incorporated into the messages to prevent further spread of the messages to cameras 20 outside the scope of adjacent multicast domains 60.

Figure 4:
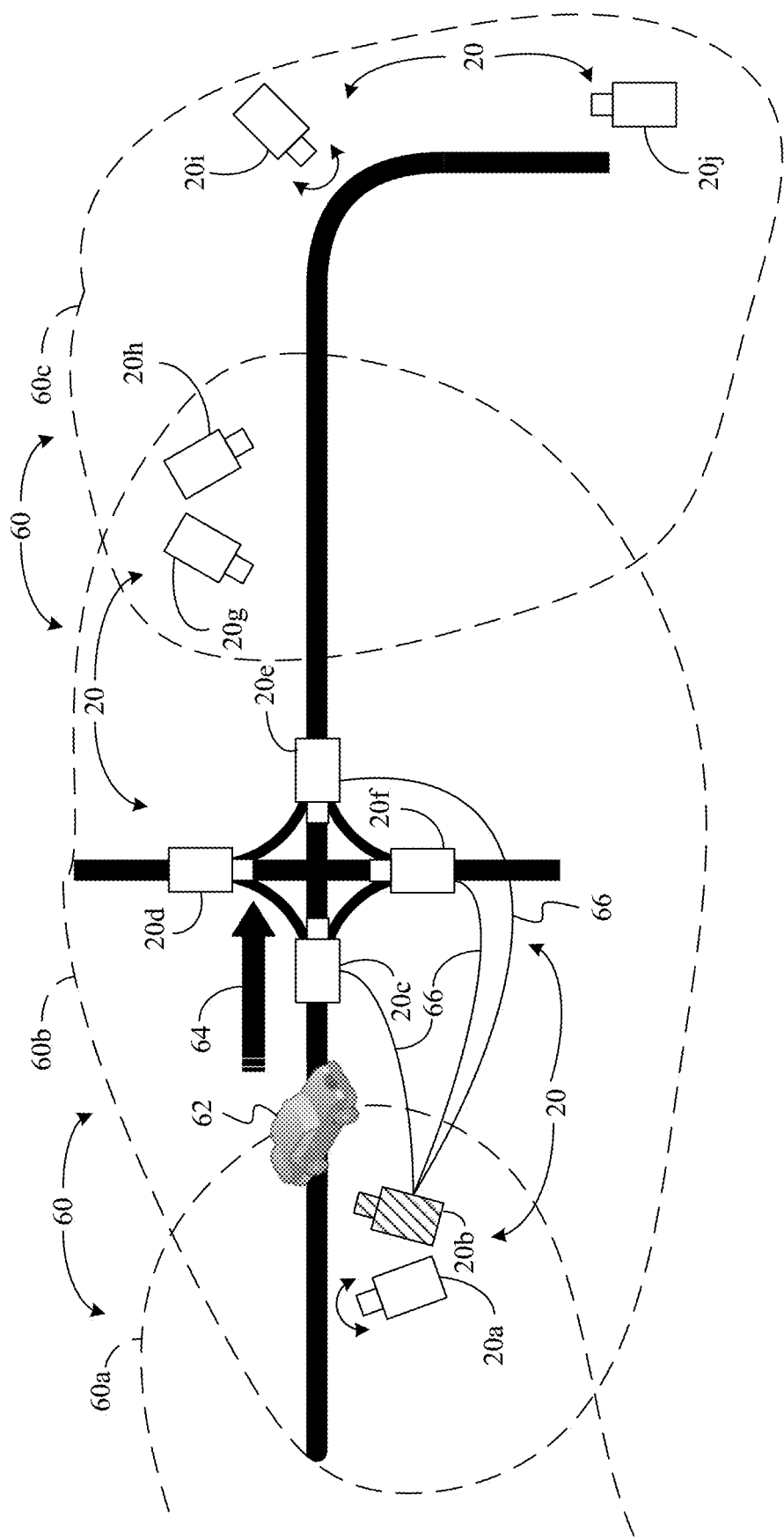
FIG. 4 is a plan view of an example of communications from an origination camera according to an embodiment.

Turning now to FIG. 4, a scenario is shown in which the second camera 20b (e.g., origination camera) detects a vehicle 62 traveling in a direction 64. In the illustrated example, the second camera 20b sends messages 66 to the third camera 20c, the fifth camera 20e, and the sixth camera 20f in a second multicast domain 60b. In an embodiment, the messages 66 include a cell representation of the local space monitored by the second camera 20b and/or the direction 64 (e.g., trajectory) of the vehicle 62. The cell representation may also include one or more features (e.g., speed, angle, acceleration, identification/recognition results, etc.) of the vehicle 62. Moreover, the cell representation may include a fixed number of cells (e.g., place cells).

Figure 5:
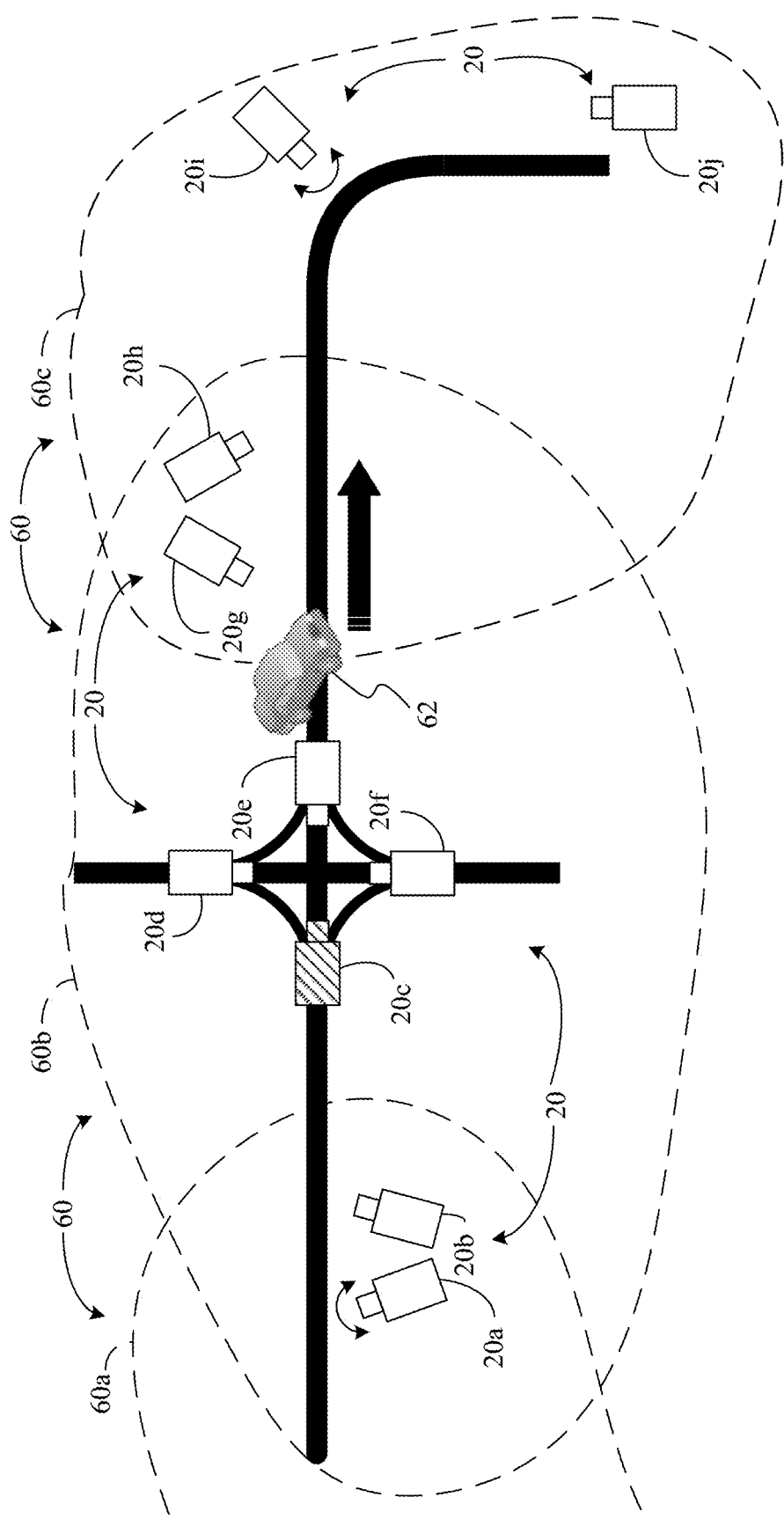
FIG. 5 is a plan view of an example of a leader election according to an embodiment.

FIG. 5 demonstrates that a leader election process may then take place. In one example, the NPlaceCells metric is communicated from each of the third camera 20c, the fifth camera 20e, and the sixth camera 20f to one another and the adjacent nodes in the second multicast domain 60b. In general, edge nodes that propose the highest NPlaceCells metrics will be accepted as the leader(s), given that those nodes have the highest opportunities to extend the tracking process based on the probability of the object of interest appearing in their respective fields of view. Leader(s) edge nodes then activate their respective tracking subsystems, and non-leader edge nodes may enter an idle state to save resources. In the illustrated example, the third camera 20c is selected as the leader, given that the predicted path of the vehicle 62 will be mostly contained in the space visible to the third camera 20c.

As already noted, every camera 20 may use a place cell system with different numbers of place cells, and a fair comparison mechanism may be implemented to calculate and weigh the NPlaceCells metric so cameras with a higher number of place cells do not monopolize the leader status over the execution of the procedure. In one example, every camera 20 may use a place cell system with the same number of place cells to enable a fair comparison using the NPlaceCells metric. In an embodiment, the leader(s) multicast the trajectory and/or cell representation routinely/periodically. At each of these timepoints, the leader selection result may be re-evaluated. Once any of the leader(s) has little "coverage left" (e.g., future NPlaceCells) that leader(s) may simply loose the leader status and some other node may assume the lost leader status.

Figure 6A:
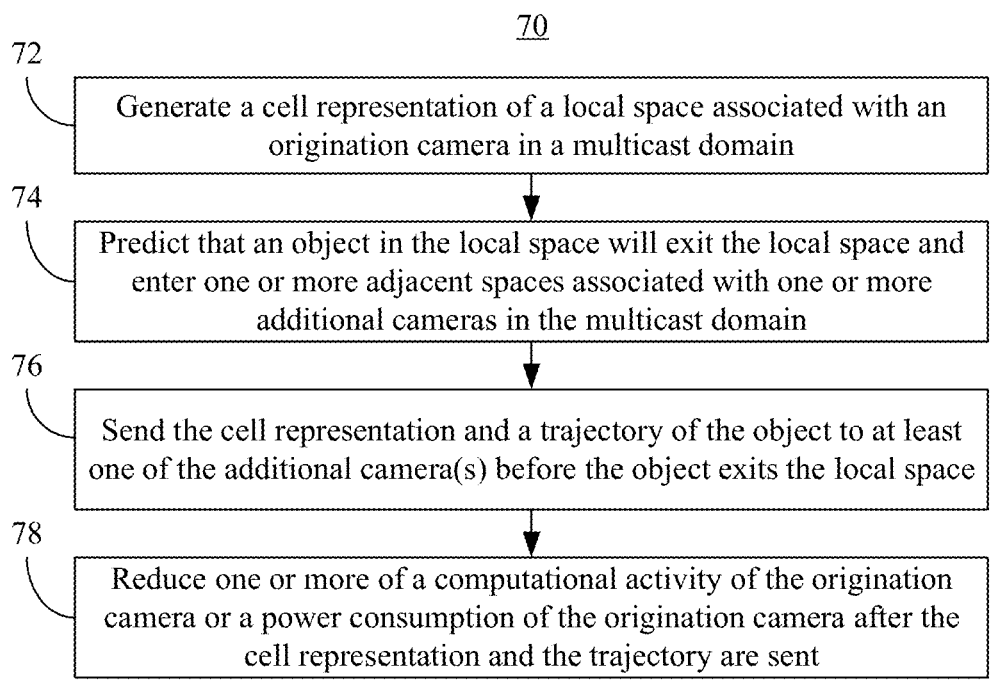
FIG. 6A is a flowchart of an example of a method of operating an origination camera according to an embodiment.

FIG. 6A shows a method 70 of operating an origination camera. The method 70 may generally be implemented in an edge node such as, for example, the second camera 20b (FIG. 4), already discussed. More particularly, the method 70 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 70 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 72 generates a cell representation of a local space associated with the origination camera in a multicast domain. In an embodiment, the cell representation includes a fixed number of cells. Block 74 provides for predicting that an object in the local space will exit the local space and enter one or more adjacent spaces associated with one or more additional cameras in the multicast domain. The cameras might be deployed in traffic lights (e.g., to track vehicles), where place cells are fine grained in street locations and coarser in locations adjacent to streets (e.g., sidewalks, building walls). The cameras may also be deployed in smart doorbells (e.g., to track individuals/people), where place cells are fine grained in sidewalk locations and coarser in locations adjacent to streets (e.g., streets, buildings). In one example, block 74 includes using a neural network to make the illustrated prediction.

The cell representation and a trajectory of the object may be sent at block 76 to at least one of the additional camera(s) before the object exits the local space (e.g., giving the additional camera(s) sufficient time to exit the idle state, prepare for capturing the object, etc.). In an embodiment, the multicasted cell representation includes one or more of a first set of cells corresponding to predicted activity, a second set of cells corresponding to observed inactivity or a third set of cells corresponding to observed activity. Additionally, the multicasted cell representation may include one or more features (e.g., metadata specifying speed, angle, acceleration, identification/recognition results, etc.) of the object. Illustrated block 78 reduces one or more of a computational activity of the origination camera or a power consumption of the origination camera after the cell representation and the trajectory are sent. In an embodiment, block 78 includes placing the origination camera into an idle state.

The illustrated exchange of cell representations and/or trajectories between cameras enhances performance by eliminating human error and enabling the tracking of a relatively high number of objects simultaneously. Moreover, performance may further be improved through the reduction of computational overhead and/or power consumption and the elimination of blind spots. Additionally, the illustrated method 70 reduces equipment, deployment and/or maintenance costs.

Figure 6B:
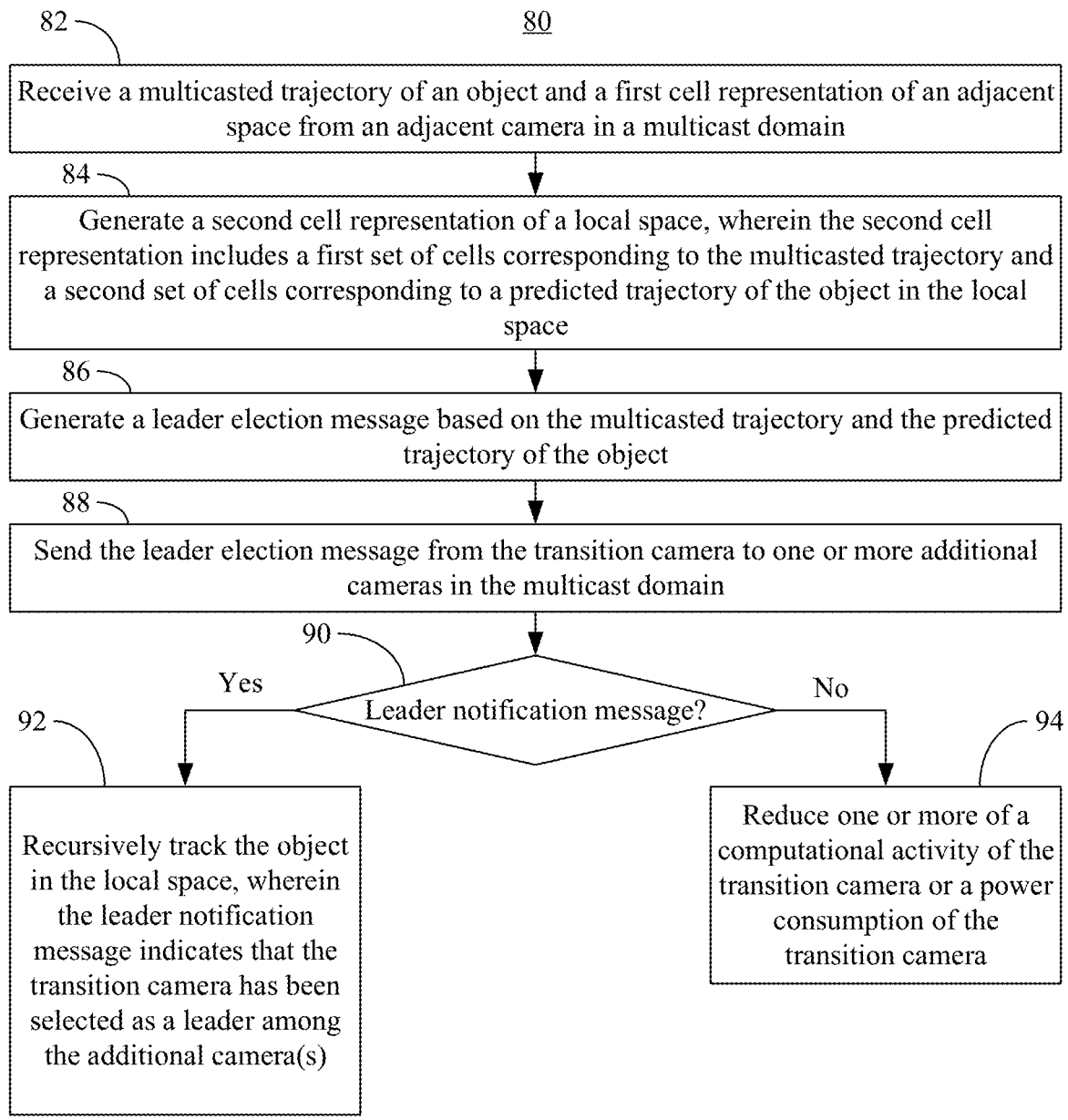
FIG. 6B is a flowchart of an example of a method of operating a transition camera according to an embodiment.

FIG. 6B shows a method 80 of operating a transition camera. The method 80 may generally be implemented in an edge node such as, for example, the third, fifth and/or sixth cameras 20c, 20e, 20f (FIG. 5), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 receives a multicasted trajectory of an object and a first cell representation of an adjacent space from an adjacent (e.g., origination) camera in a multicast domain. In one example, the first cell representation includes one or more of a first set of cells corresponding to predicted activity, a second set of cells corresponding to observed inactivity or a third set of cells corresponding to observed activity. Block 84 provides for generating a second cell representation of a local space, wherein the second cell representation includes one or more of a first set of cells corresponding to the multicasted trajectory or a second set of cells corresponding to a predicted trajectory of the object in the local space. The second cell representation may include a fixed number of cells. In an embodiment, block 84 includes using a neural network to predict the trajectory of the object in the local space.

A leader election message may be generated at block 86 based on the multicasted trajectory and the predicted trajectory of the object. In one example, the leader election message includes a predicted number of cells that will be activated by the object. Illustrated block 88 sends the leader election message to one or more additional cameras in the multicast domain, where a determination is made at 90 as to whether a leader notification message has been received. For example, the leader notification message might indicate that the transition camera has been selected as a leader among the one or more additional cameras.

If the leader notification message is detected at block 90, the object is recursively tracked (e.g., repeatedly until the tracking session ends) in the local space at block 92. If the leader notification message is not detected at block 90 (e.g., after an appropriate time period), illustrated block 94 reduces one or more of a computational activity of the transition camera or a power consumption of the transition camera. In one example, block 94 includes placing the transition camera in an idle state.

The illustrated exchange of leader messages between cameras enhances performance by eliminating human error and enabling the tracking of a relatively high number of objects simultaneously. Moreover, performance may further be improved through the reduction of computational overhead and/or power consumption and the elimination of blind spots. Additionally, the illustrated method 80 reduces equipment, deployment and/or maintenance costs.

Figure 7:
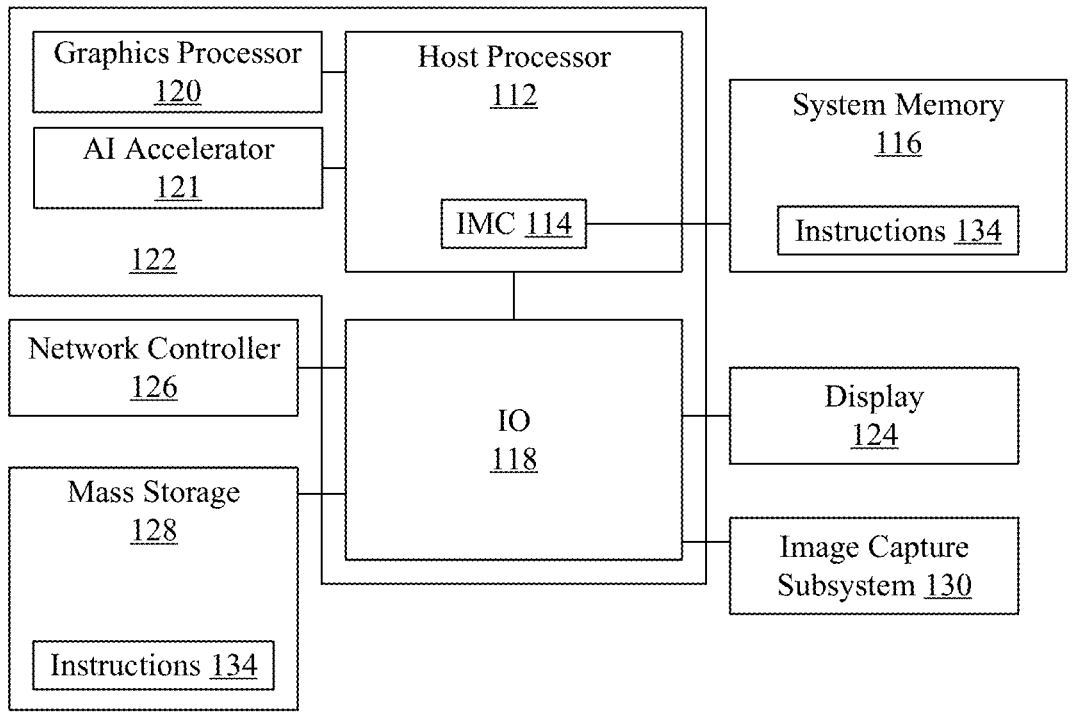
FIG. 7 is a block diagram of an example of a performance-enhanced computing system according to an embodiment.

Turning now to FIG. 7, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, traffic light functionality, doorbell functionality, etc., or any combination thereof. In the illustrated example, the system 110 includes a host processor 112 (e.g., central processing unit/CPU) having an integrated memory controller (IMC) 114 that is coupled to a system memory 116.

The illustrated system 110 also includes an input output (TO) module 118 implemented together with the host processor 112, an AI (artificial intelligence) accelerator 121 and a graphics processor 120 (e.g., graphics processing unit/GPU) on a semiconductor die 122 as a system on chip (SoC). In an embodiment, the semiconductor die 122 also includes a vision processing unit (VPU, not shown). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory). The illustrated computing system 110 also includes an image capture system 130 having one or more stationary (e.g., fixed) and/or non-stationary (e.g., PTZ) cameras. The image capture system 130 may communicate with the rest of the system 110 via wired and/or wireless links.

In an embodiment, the host processor 112, the graphics processor 120, the AI accelerator 121, the VPU and/or the IO module 118 execute program instructions 134 retrieved from the system memory 116 and/or the mass storage 128 to perform one or more aspects of the method 70 (FIG. 6A) and/or the method 80 (FIG. 6B), already discussed.

Thus, when the system 110 is operated as an origination camera (e.g., edge node), execution of the illustrated instructions 134 may cause the die 122 to generate a cell representation of a local space associated with the origination camera in a multicast domain and predict that an object in the local space will exit the local space and enter one or more adjacent spaces associated with one or more additional cameras in the multicast domain. In such a case, execution of the instructions 134 may also cause the die 122 to send the cell representation and a trajectory of the object to at least one of the additional camera(s) before the object exits the local space.

When the system 110 is operated as a transition camera (e.g., edge node) execution of the illustrated instructions 134 may cause the die 122 to generate a leader election message based on a multicasted trajectory of an object and a predicted trajectory of the object, wherein the multicasted trajectory is to be associated with a first cell representation of an adjacent space and the predicted trajectory is to be associated with a second cell representation of a local space. In such a case, execution of the instructions 134 may also cause the die 122 to send the leader election message from the transition camera to one or more additional cameras in a multicast domain and recursively track (e.g., repeatedly until the tracking session ends) the object in the local space in response to a leader notification message. In an embodiment, the leader notification message is to indicate that the transition camera has been selected as a leader among the additional camera(s).

When operated as an origination camera, the system 110 is therefore considered to be performance-enhanced at least to the extent that the exchange of cell representations and/or trajectories between cameras enhances performance by eliminating human error and enabling the tracking of a relatively high number of objects simultaneously. Moreover, performance may further be improved through the reduction of computational overhead and/or power consumption and the elimination of blind spots. Additionally, the illustrated system 110 has reduced equipment, deployment and/or maintenance costs.

When operated as a transition camera, the illustrated system 110 is considered performance-enhanced at least to the extent that the exchange of leader messages between cameras enhances performance by eliminating human error and enabling the tracking of a relatively high number of objects simultaneously. Moreover, performance may further be improved through the reduction of computational overhead and/or power consumption and the elimination of blind spots. Again, the illustrated system 110 has reduced equipment, deployment and/or maintenance costs.

Figure 8:
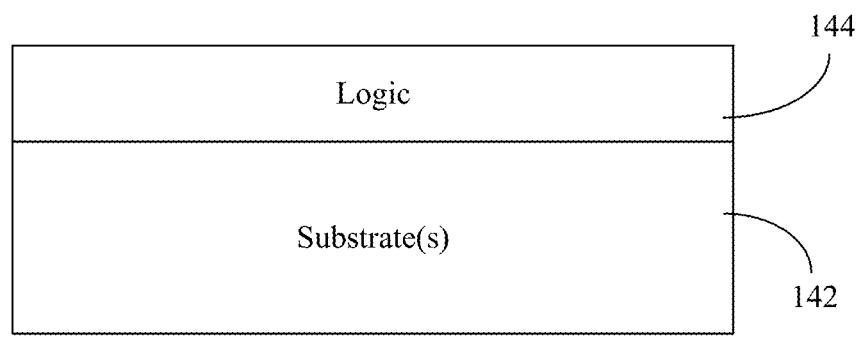
FIG. 8 is an illustration of an example of a semiconductor apparatus according to an embodiment.

FIG. 8 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. Thus, the logic 144 might include a host processor, a graphics processor, an AI accelerator, a VPU, an IO module, etc., or any combination thereof. In one example, the logic 144 implements one or more aspects of the method 70 (FIG. 6A) and/or the method 80 (FIG. 6B), already discussed.

Thus, when the apparatus 140 is operated in an origination camera (e.g., edge node), the logic 144 may generate a cell representation of a local space associated with the origination camera in a multicast domain and predict that an object in the local space will exit the local space and enter one or more adjacent spaces associated with one or more additional cameras in the multicast domain. In such a case, the logic 144 may send the cell representation and a trajectory of the object to at least one of the additional camera(s) before the object exits the local space.

When the apparatus 140 is operated in a transition camera (e.g., edge node) the logic 144 generate a leader election message based on a multicasted trajectory of an object and a predicted trajectory of the object, wherein the multicasted trajectory is to be associated with a first cell representation of an adjacent space and the predicted trajectory is to be associated with a second cell representation of a local space. In such a case, the logic 144 may send the leader election message from the transition camera to one or more additional cameras in a multicast domain and track the object in the local space in response to a leader notification message. In an embodiment, the leader notification message is to indicate that the transition camera has been selected as a leader among the additional camera(s).

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 9:
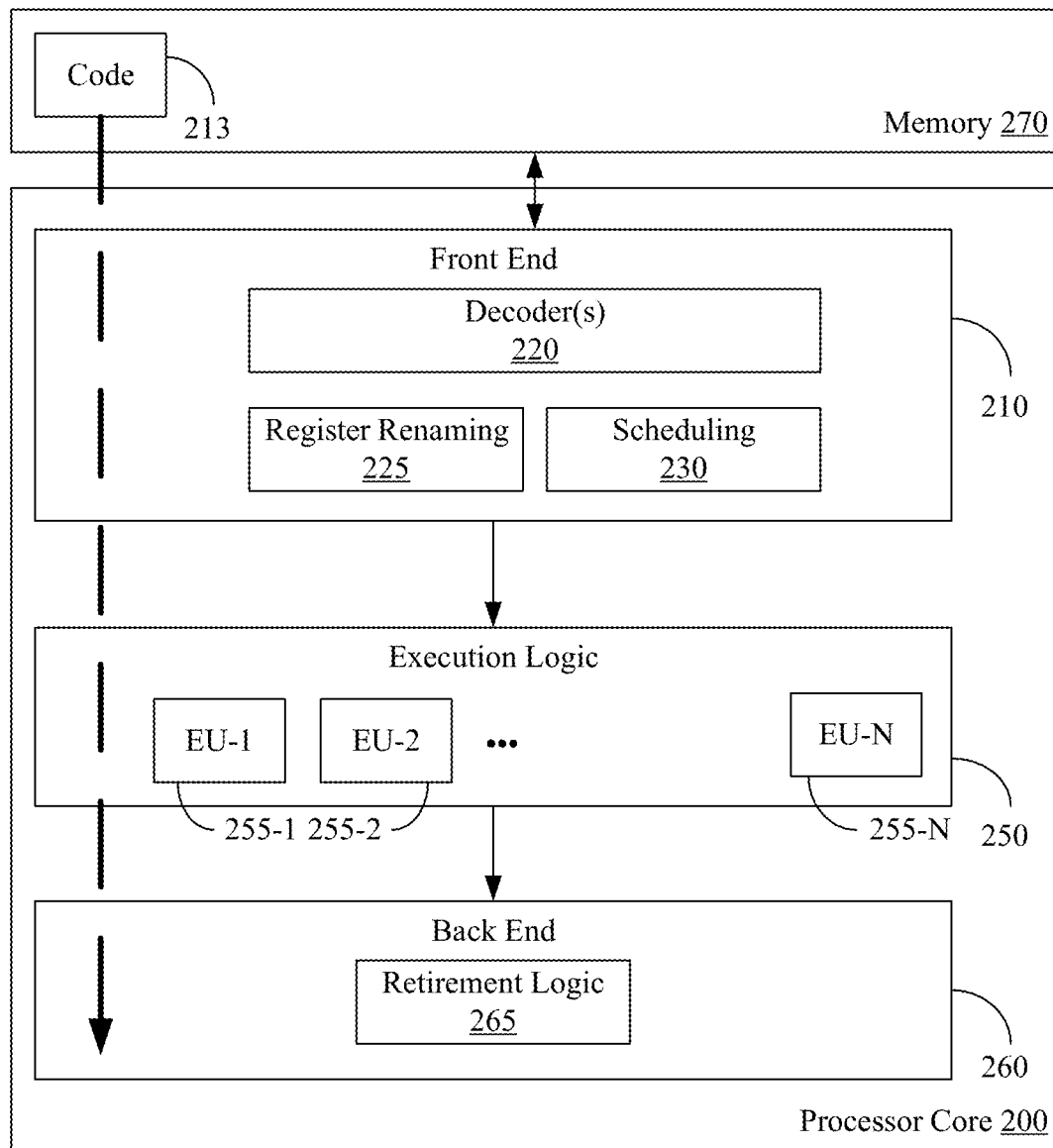
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 70 (FIG. 6A) and/or the method 80 (FIG. 6B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of method 70 (FIG. 6A) and/or the method 80 (FIG. 6B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes at least one computer readable storage medium comprising a set of executable program instructions, which when executed by an origination camera in a multicast domain, cause the origination camera to generate a cell representation of a local space associated with the origination camera, predict that an object in the local space will exit the local space and enter one or more adjacent spaces associated with one or more additional cameras in the multicast domain, and send the cell representation and a trajectory of the object to at least one of the one or more additional cameras before the object exits the local space.

Example 2 includes the at least one computer readable storage medium of Example 1, wherein the cell representation is to include one or more of a first set of cells corresponding to predicted activity, a second set of cells corresponding to observed inactivity or a third set of cells corresponding to observed activity.

Example 3 includes the at least one computer readable storage medium of Example 1, wherein the cell representation is to include one or more features of the object.

Example 4 includes the at least one computer readable storage medium of Example 1, wherein the cell representation is to include a fixed number of cells.

Example 5 includes the at least one computer readable storage medium of Example 1, wherein the instructions, when executed, further cause the origination camera to reduce one or more of a computational activity of the origination camera or a power consumption of the origination camera after the cell representation and the trajectory are sent.

Example 6 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate a cell representation of a local space associated with an origination camera in a multicast domain, predict that an object in the local space will exit the local space and enter one or more adjacent spaces associated with one or more additional cameras in the multicast domain, and send the cell representation and a trajectory of the object to at least one of the one or more additional cameras before the object exits the local space.

Example 7 includes the semiconductor apparatus of Example 6, wherein the cell representation is to include one or more of a first set of cells corresponding to predicted activity, a second set of cells corresponding to observed inactivity or a third set of cells corresponding to observed activity.

Example 8 includes the semiconductor apparatus of Example 6, wherein the cell representation is to include one or more features of the object.

Example 9 includes the semiconductor apparatus of Example 6, wherein the cell representation is to include a fixed number of cells.

Example 10 includes the semiconductor apparatus of Example 6, wherein the logic coupled to the one or more substrates is to reduce one or more of a computational activity of the origination camera or a power consumption of the origination camera after the cell representation and the trajectory are sent.

Example 11 includes the semiconductor apparatus of Example 6, wherein the logic coupled to the one or more substrates includes transistor channel regions that are positioned within the one or more substrates.

Example 12 includes at least one computer readable storage medium comprising a set of executable program instructions, which when executed by a transition camera in a multicast domain, cause the transition camera to generate a leader election message based on a multicasted trajectory of an object and a predicted trajectory of the object, wherein the multicasted trajectory is to be associated with a first cell representation of an adjacent space and the predicted trajectory is to be associated with a second cell representation of a local space, send the leader election message to one or more additional cameras in the multicast domain, and recursively track the object in the local space in response to a leader notification message, wherein the leader notification message is to indicate that the transition camera has been selected as a leader among the one or more additional cameras.

Example 13 includes the at least one computer readable storage medium of Example 12, wherein the instructions, when executed, further cause the transition camera to generate the second cell representation, wherein the second cell representation is to include one or more of a first set of cells corresponding to the multicasted trajectory or a second set of cells corresponding to the predicted trajectory.

Example 14 includes the at least one computer readable storage medium of Example 12, wherein the second cell representation is to include a fixed number of cells.

Example 15 includes the at least one computer readable storage medium of Example 12, wherein the leader election message is to include a predicted number of cells that will be activated by the object.

Example 16 includes the at least one computer readable storage medium of Example 12, wherein the instructions, when executed, further cause the transition camera to receive the multicasted trajectory and the first cell representation from an adjacent camera.

Example 17 includes the at least one computer readable storage medium of Example 16, wherein the first cell representation is to include one or more of a first set of cells corresponding to predicted activity, a second set of cells corresponding to observed inactivity or a third set of cells corresponding to observed activity.

Example 18 includes the at least one computer readable storage medium of Example 12, wherein the instructions, when executed, further cause the transition camera to reduce one or more of a computational activity of the transition camera or a power consumption of the transition camera if the leader notification message is not received.

Example 19 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate a leader election message based on a multicasted trajectory of an object and a predicted trajectory of the object, wherein the multicasted trajectory is to be associated with a first cell representation of an adjacent space and the predicted trajectory is to be associated with a second cell representation of a local space, send the leader election message from a transition camera to one or more additional cameras in a multicast domain, and recursively track the object in the local space in response to a leader notification message, wherein the leader notification message is to indicate that the transition camera has been selected as a leader among the one or more additional cameras.

Example 20 includes the semiconductor apparatus of Example 19, wherein the logic coupled to the one or more substrates is to generate the second cell representation, wherein the second cell representation is to include one or more of a first set of cells corresponding to the multicasted trajectory or a second set of cells corresponding to the predicted trajectory.

Example 21 includes the semiconductor apparatus of Example 19, wherein the second cell representation is to include a fixed number of cells.

Example 22 includes the semiconductor apparatus of Example 19, wherein the leader election message is to include a predicted number of cells that will be activated by the object.

Example 23 includes the semiconductor apparatus of Example 19, wherein the logic coupled to the one or more substrates is further to receive the multicasted trajectory and the first cell representation from an adjacent camera.

Example 24 includes the semiconductor apparatus of Example 23, wherein the first cell representation is to include one or more of a first set of cells corresponding to predicted activity, a second set of cells corresponding to observed inactivity or a third set of cells corresponding to observed activity, and wherein the logic coupled to the one or more substrates is to reduce one or more of a computational activity of the transition camera or a power consumption of the transition camera if the leader notification message is not received.

Example 25 includes the semiconductor apparatus of Example 19, wherein the logic coupled to the one or more substrates includes transistor channel regions that are positioned within the one or more substrates.

Example 26 includes a method of operating an origination camera, the method comprising generating a cell representation of a local space associated with the origination camera, predicting that an object in the local space will exit the local space and enter one or more adjacent spaces associated with one or more additional cameras in the multicast domain, and sending the cell representation and a trajectory of the object to at least one of the one or more additional cameras before the object exits the local space.

Example 27 includes the method of Example 26, wherein the cell representation includes one or more of a first set of cells corresponding to predicted activity, a second set of cells corresponding to observed inactivity or a third set of cells corresponding to observed activity.

Example 28 includes the method of Example 26, wherein the cell representation includes one or more features of the object.

Example 29 includes the method of Example 26, wherein the cell representation includes a fixed number of cells.

Example 30 includes the method of any one of Examples 26 to 29, further including reducing one or more of a computational activity of the origination camera or a power consumption of the origination camera after the cell representation and the trajectory are sent.

Example 31 includes means for performing the method of any one of Examples 26 to 30.

Example 32 includes an origination camera comprising an image capture subsystem, a processor coupled to the image capture subsystem, and a memory coupled to the processor, wherein the memory includes a set of executable program instructions, which when executed by the processor, cause the processor to perform the method of any one of Examples 26 to 30.

Example 33 includes a method of operating a transition camera, the method comprising generating a leader election message based on a multicasted trajectory of an object and a predicted trajectory of the object, wherein the multicasted trajectory is associated with a first cell representation of an adjacent space and the predicted trajectory is associated with a second cell representation of a local space, sending the leader election message to one or more additional cameras in the multicast domain, and recursively tracking the object in the local space in response to a leader notification message, wherein the leader notification message indicates that the transition camera has been selected as a leader among the one or more additional cameras.

Example 34 includes the method of Example 33, further including generating the second cell representation, wherein the second cell representation includes one or more of a first set of cells corresponding to the multicasted trajectory or a second set of cells corresponding to the predicted trajectory.

Example 35 includes the method of Example 33, wherein the second cell representation includes a fixed number of cells.

Example 36 includes the method of Example 33, wherein the leader election message includes a predicted number of cells that will be activated by the object.

Example 37 includes the method of Example 33, further including receiving the multicasted trajectory and the first cell representation from an adjacent camera.

Example 38 includes the method of Example 37, wherein the first cell representation includes one or more of a first set of cells corresponding to predicted activity, a second set of cells corresponding to observed inactivity or a third set of cells corresponding to observed activity.

Example 39 includes the method of any one of Examples 33 to 38, further including reducing one or more of a computational activity of the transition camera or a power consumption of the transition camera if the leader notification message is not received.

Example 40 includes means for performing the method of any one of Examples 33 to 39.

Example 41 includes a transition camera comprising an image capture subsystem, a processor coupled to the image capture subsystem, and a memory coupled to the processor, wherein the memory includes a set of executable program instructions, which when executed by the processor, cause the processor to preform the method of any one of Examples 33 to 39.

Thus, technology described herein guarantees reliability, scalability, availability and efficiency of an entire tracking system. More particularly, the technology provides a cost-efficient solution for object tracking/identification. The compute load is mainly performed on cameras involved on the tracking/identification at a certain time, instead of executing video analytics on all cameras "just in case". Namely, such an approach decreases power consumption and possibly temperature. For example, simpler certifications and simpler hardware may minimize dissipation, which leads to a less expensive bill of materials. Additionally, the technology provides for efficient distributed video processing with a focus on reliability and resiliency. Moreover, the technology is highly efficient for identification and tracking without relying on human (e.g., operator) attention. Indeed, the technology is highly efficient for identification and tracking by being able to monitor many different video feeds in parallel (e.g., compared with human monitoring, which may be limited checking only a few video feeds). The technology is also able to correlate the information from different video feeds.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one computer readable storage medium comprising a set of executable program instructions, which when executed by an origination camera in a multicast domain, cause the origination camera to:
   generate a cell representation of a local space associated with the origination camera, wherein the cell representation is to include a plurality of cells that provide a soft tiling of the local space, wherein the plurality of cells is to include a first set of cells corresponding to observed inactivity and a second set of cells corresponding to observed activity, and wherein the first set of cells is to include unoccupied cells;
   predict that an object in the local space will exit the local space and enter one or more adjacent spaces associated with one or more additional cameras in the multicast domain; and
   send the cell representation and a trajectory of the object to at least one of the one or more additional cameras before the object exits the local space.

2. The at least one computer readable storage medium of claim 1, wherein the plurality of cells is to include a third set of cells corresponding to predicted activity.

3. The at least one computer readable storage medium of claim 1, wherein the cell representation is to include one or more features of the object.

4. The at least one computer readable storage medium of claim 1, wherein the cell representation is to include a fixed number of cells.

5. The at least one computer readable storage medium of claim 1, wherein the instructions, when executed, further cause the origination camera to reduce one or more of a computational activity of the origination camera or a power consumption of the origination camera after the cell representation and the trajectory are sent.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
generate a cell representation of a local space associated with an origination camera in a multicast domain, wherein the cell representation is to include a plurality of cells that provide a soft tiling of the local space, wherein the plurality of cells is to include a first set of cells corresponding to observed inactivity and a second set of cells corresponding to observed activity, and wherein the first set of cells is to include unoccupied cells;
predict that an object in the local space will exit the local space and enter one or more adjacent spaces associated with one or more additional cameras in the multicast domain; and
send the cell representation and a trajectory of the object to at least one of the one or more additional cameras before the object exits the local space.

7. The semiconductor apparatus of claim 6, wherein the plurality of cells is to include a third set of cells corresponding to predicted activity.

8. The semiconductor apparatus of claim 6, wherein the cell representation is to include one or more features of the object.

9. The semiconductor apparatus of claim 6, wherein the cell representation is to include a fixed number of cells.

10. The semiconductor apparatus of claim 6, wherein the logic coupled to the one or more substrates is to reduce one or more of a computational activity of the origination camera or a power consumption of the origination camera after the cell representation and the trajectory are sent.

11. The semiconductor apparatus of claim 6, wherein the logic coupled to the one or more substrates includes transistor channel regions that are positioned within the one or more substrates.

* * * * *